United States Patent [19]
Griffin

[11] 3,773,114
[45] Nov. 20, 1973

[54] SHOVEL COUPLING
[76] Inventor: Robert M. Griffin, Chester, Mont. 59522
[22] Filed: Mar. 31, 1972
[21] Appl. No.: 240,048

[52] U.S. Cl............. 172/762, 37/142 A, 287/20.3, 306/1.6
[51] Int. Cl........................................... A01b 35/20
[58] Field of Search........................... 172/762, 763; 306/1.5, 1.6; 37/142; 287/20, 20.3

[56] References Cited
UNITED STATES PATENTS

| | | | |
|---|---|---|---|
| 2,757,595 | 8/1956 | Clifford et al. | 172/762 |
| 3,020,655 | 2/1962 | Launder | 37/142 R |
| 3,104,724 | 9/1963 | Pollock | 172/762 |
| 3,156,307 | 11/1964 | Bledsoe | 172/762 X |
| 3,608,218 | 9/1971 | Sturgeon | 37/142 A |

FOREIGN PATENTS OR APPLICATIONS
1,304,304   4/1962   France................. 172/762

*Primary Examiner*—Robert E. Pulfrey
*Assistant Examiner*—Paul T. Sewell
*Attorney*—Harvey B. Jacobson

[57] ABSTRACT

A coupling for conveniently attaching a cultivator shovel to a shank member, said coupling comprising a rigid mounting block with a relatively large planar surface in snug engagement with a correspondingly shaped mounting surface of the shank member whereby the forces are distributed over a relatively large area, a pair of fingers projecting from the block into retentive engagement with mounting holes in the shank member, and a compressible, resilient retaining pin passing through a bore in the mounting block with opposite end portions extending through aligned mounting apertures in a neck portion of the cultivator shovel.

7 Claims, 3 Drawing Figures

PATENTED NOV 20 1973

3,773,114

SHOVEL COUPLING

The present invention is generally related to soil cultivators and, more particularly, to an improved coupling for mounting sweep shovels to a shank member associated with a plow, or the like.

In the past, various types of sweep and cultivator mountings have been provided in an effort to assure secure rigid connections with the associated shank member. Such conventional constructions, for the most part, have proven unsatisfactory since they were difficult to assemble and often subject to excessive wear causing disassembly and possible loss of the shovel while plowing. In addition, the nature of such conventional arrangements caused wear to abutting shank member.

Therefore, it is an object of the present invention to provide an improved sweep shovel coupling which may be conveniently installed in a minimum amount of time and which significantly reduces the wear of the coupling and associated shank member.

Another object of the present invention is to provide a unique sweep shovel coupling which includes a coupling block with a relatively large surface area adapted to snugly engage a corresponding surface area on the shank member, such that the forces exerted therebetween are distributed over a relatively large area of the shank member to reduce wear over a period of time.

It is a further object of the present invention to provide a versatile shovel coupling which includes a rigid coupling block which is fastened to a sweep shovel by way of a semi-resilient retaining pin which tends to cushion and attenuate many of the vibrations and shocks between the shovel and coupling block.

Still another object of the present invention is to provide a novel sweep shovel coupling which includes a small number of parts, is easy to install, is relatively inexpensive to manufacture and increases the life expectancy of the shank member to which it is mounted.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
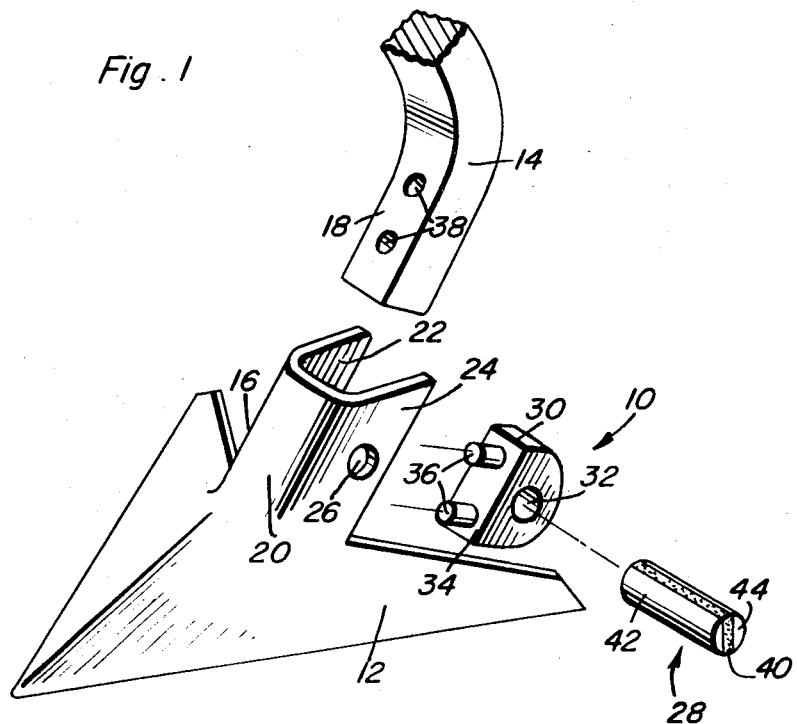
FIG. 1 is an exploded perspective view of the coupling of the present invention illustrated with a conventional shovel and shank member.

Referring now in more detail to the drawings, the sweep shovel coupling of the present invention is generally indicated by the numeral 10 and is utilized to fasten a conventional cultivator or sweep shovel 12 with an elongated shank member 14 normally associated with conventional plows or similar equipment. Previously, this fastening was often achieved by way of threaded bolts or similar fasteners which resulted in excessive wear of the shank member after a period of use. As such, it was often necessary to periodically repair of replace the relatively expensive shank member. By utilizing the coupling of the present invention, this wear is significantly reduced, thereby increasing the life expectancy of the associated shank member and reducing the costs of the cultivating operation.

The shovel illustrated, as most conventional sweep shovels, includes an upwardly directed neck as indicated at 16 which is adapted to receive the lower end portion of a shank member such as that indicated at 14. The shank member may be provided with a generally planar front mounting surface 18 which is adapted to snugly engage a correspondingly shaped surface area on the interior of the front wall 20 of the shovel neck 16. The neck is also provided with a pair of backwardly extending, oppositely disposed flange portions 22 and 24 which terminate at their vertical edges to define an opening through which the coupling of the present invention may be inserted during assembly. The flange portions are provided with aligned mounting apertures 26 which are adapted to retentively receive the end portions of a retaining pin generally indicated by the numeral 28 associated with the coupling of the present invention.

The coupling includes a mounting block 30 formed from relatively rigid materials such as steel or aluminum and being provided with an open-ended bore 32 which is adapted to receive a central portion of the retaining pin 28. The mounting block is further provided with a substantially planar mounting surface 34 which is of a configuration similar to the back surfaces of the shank member 14. A pair of parallel, vertically spaced mounting fingers 36 protrude from mounting surface 34 of the mounting block and are adapted to be retentively received by a pair of vertically spaced mounting holes 38 formed in the shank member. Preferably, these holes are existing in the shank member as originally manufactured and were intended to receive threaded bolts for the purposes of securing the shovel or similar tool in position.

Figure 3:
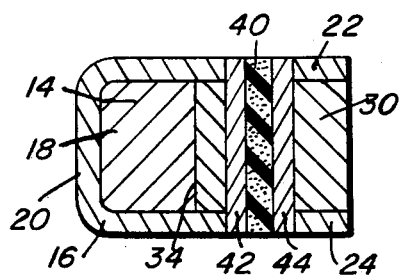
FIG. 3 is a sectional view taken along section 3—3 of FIG. 2.
Figure 2:
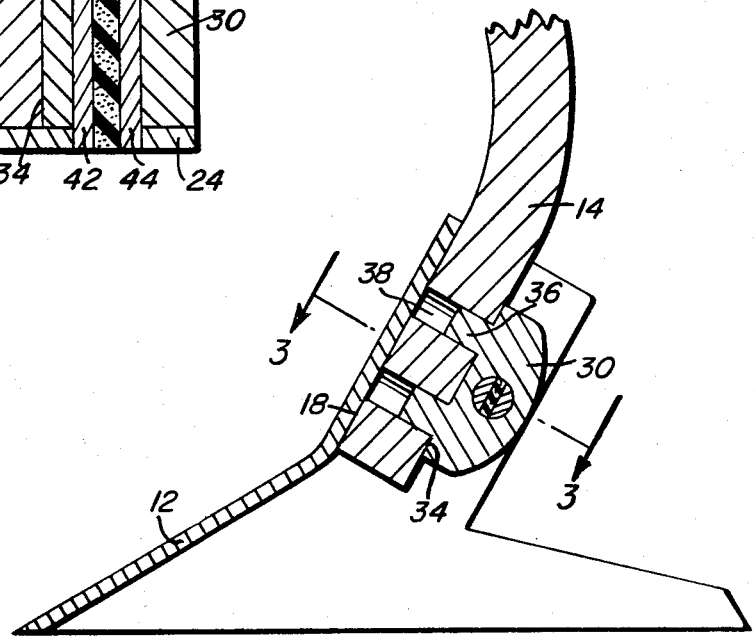
FIG. 2 is a sectional view of the coupling, shovel, and shank member shown in FIG. 1 but in an assembled condition.

Retaining pin 28 is generally cylindrical in configuration and is semi-resilient in nature due to a compressible, resilient section 40 of rubber or similar materials sandwiched between a pair of convex rigid sections 42 and 44. During assembly of the shovel to the shank member, the retaining pin is compressed somewhat by pliers or a similar tool prior to insertion through the open-ended bore of the mounting block and the mounting apertures associated with the sweep shovel. After initial insertion has been made, the retaining pin may be hammered or tapped into its coupling position as best illustrated in FIG. 3. It will be appreciated that the resiliency of the retaining pin provides a snug retentive fit with the interior walls of the open-ended bore and mounting apertures. Furthermore, the resiliency of the retaining pin is also effective to reduce many of the vibrations and shocks between the shovel and shank member. It will be observed that the sweep shovel is maintained in snug engagement with the shank member by contact between the front wall 20 of the shovel and the front mounting surfaces 18 of the shank plus the engagement between the relatively large mounting surfaces 34 associated with the mounting block and the back surfaces of the shank member. Thus, the coupling forces acting upon the shank member are distributed over a substantially large surface area, thereby minimizing the wear of the shank member over a period of time compared with conventional sweep shovel mounting arrangements.

From the foregoing description, it will be appreciated that the sweep shovel coupling of the present invention includes a small number of parts, is easy to install, and provides a firm, secure mounting which minimizes the degree of wear of the associated shank member. Thus, by utilizing the coupling of the present invention, the costs of a cultivating operation may be reduced over a period of time. Furthermore, the majority of the wear encountered through normal use will occur with the mounting block, rather than the shank member. The relatively simple construction of the mounting block renders it a relatively inexpensive item to replace or repair, if such should be necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a cultivator shovel comprising a neck portion with a relatively rigid front wall and a pair of oppositely disposed flanges extending therefrom and terminating at edges defining an access opening, said oppositely disposed flanges including a pair of aligned mounting apertures; a shank member including a front mounting surface in snug engagement with the surfaces of said mounting wall, and a back surface on said shank member disposed oppositely of said front mounting surface; and a coupling securely fastening said shovel to said shank member, said coupling comprising a rigid mounting block including a relatively large mounting surface area on one side thereof and a retaining hole extending therethrough, said coupling further including a retaining pin passing through said retaining hole with opposite end portions extending through said mounting apertures and in retentive engagement therewith, said retaining pin including an elongated resilient section of material, said mounting block including at least one integral mounting finger protruding from said mounting surface area and said shank member includes at least one mounting hole retentively receiving said mounting finger, the mounting surface area of said mounting block being in flush engagement with said back surface of said shank member to provide a solid connection between said shovel neck portion and said shank member.

2. The combination set forth in claim 1 wherein said mounting block includes a pair of said mounting fingers spaced from each other, and said shank member includes a pair of said mounting holes retentively receiving said pair of mounting fingers.

3. The combination set forth in claim 2 wherein said front wall surfaces are generally of planar configuration with said flanges extending perpendicular thereto and in abutting engagement with the side surfaces of said shank member and mounting block.

4. A coupling for mounting a sweep shovel to an associated shank member, said coupling comprising a mounting block of relatively rigid material, said mounting block including a substantially planar mounting surface snugly engaging a correspondingly shaped surface on the shank member, a pair of spaced mounting fingers integral with said mounting block and protruding from said mounting surface at substantially right angles thereto, said fingers being retentively disposed in a pair of spaced mounting holes in the shank member, an open-ended bore in said mounting block spaced from and generally parallel to said planar mounting surface and aligned with corresponding mounting apertures in the sweep shovel, and an elongated retaining pin with a longitudinal compressible, resilient section sandwiched between a pair of rigid members, said retaining pin being compressibly disposed in said open-ended bore with opposite end portions extending through the mounting apertures in the sweep shovel.

5. The structure set forth in claim 4 wherein the open-ended bore in said mounting block terminates at a pair of oppositely disposed, substantially parallel side surfaces engaging corresponding surfaces on the sweep shovel.

6. The structure set forth in claim 5 wherein said mounting fingers are vertically spaced from each other and each mounting finger has a generally cylindrical configuration received by the shank member mounting holes which normally accommodate mounting bolts.

7. The structure set forth in claim 6 wherein each of said rigid members of said retaining pin is of convex configuration, the retaining pin as a whole being generally cylindrical in shape.

* * * * *